United States Patent
Ahm

(10) Patent No.: US 6,913,569 B1
(45) Date of Patent: Jul. 5, 2005

(54) PACKED TAPES AS WELL AS METHODS AND AN ASSEMBLY FOR PACKING SAID TAPES

(75) Inventor: Poul Henrik Ahm, Altea (ES)

(73) Assignee: Bentle Products AG, Zug (CH)

( * ) Notice: Subject to any disclaimer, the term of this patent is extended or adjusted under 35 U.S.C. 154(b) by 0 days.

(21) Appl. No.: 09/720,446

(22) PCT Filed: Jun. 23, 1999

(86) PCT No.: PCT/DK99/00353

§ 371 (c)(1),
(2), (4) Date: Dec. 22, 2000

(87) PCT Pub. No.: WO00/00420

PCT Pub. Date: Jan. 6, 2000

(30) Foreign Application Priority Data

Jun. 29, 1998 (DK) .............................. 1998 00833

(51) Int. Cl.[7] .......................... B65H 45/20; B65B 63/04
(52) U.S. Cl. ...................... 493/411; 493/405; 493/413; 53/429; 53/591; 47/56
(58) Field of Search ................................ 493/405, 409, 493/411, 413; 53/591, 429, 117, 473; 47/56

(56) References Cited

U.S. PATENT DOCUMENTS

| | | | |
|---|---|---|---|
| 3,643,795 A * | 2/1972 | Watwood et al. | 206/756 |
| 3,660,867 A | 5/1972 | Watson | 19/163 |
| 3,673,757 A * | 7/1972 | Willis | 53/117 |
| 4,045,012 A | 8/1977 | Jakob | 270/79 |
| 4,095,779 A | 6/1978 | Imagi et al. | 270/61 F |
| 4,146,914 A * | 3/1979 | Rayburn | 361/304 |
| 4,427,404 A * | 1/1984 | Yamada | 19/160 |
| 4,435,944 A * | 3/1984 | Meyer | 493/235 |
| 4,469,243 A * | 9/1984 | Ito et al. | 221/34 |
| 4,976,677 A * | 12/1990 | Siversson | 156/474 |
| 5,009,031 A * | 4/1991 | Knop et al. | 47/64 |
| 5,088,707 A * | 2/1992 | Stemmler | 270/32 |
| 5,101,594 A * | 4/1992 | Ahm | 47/56 |
| 5,104,107 A * | 4/1992 | Dash | 270/39.05 |
| 5,211,621 A | 5/1993 | Cheynet | 493/413 |
| 5,279,536 A * | 1/1994 | Abreu | 226/108 |
| 5,516,256 A * | 5/1996 | Ellis | 270/39.01 |

(Continued)

FOREIGN PATENT DOCUMENTS

| | | | | |
|---|---|---|---|---|
| DE | 2144686 | 3/1973 | ......... | B65H 37/06 |
| DE | 2164081 | 6/1973 | ......... | B65H 45/28 |
| DE | 3422352 | * 12/1985 | ......... | B65H 45/101 |

Primary Examiner—Rinaldi I. Rada
Assistant Examiner—Gloria R. Weeks
(74) Attorney, Agent, or Firm—Donald S. Dowden; Cooper & Dunham LLP

(57) ABSTRACT

A packed tape (1) comprises a folded tape (2) and a package (3) preferably made of plastic film. The tape (2) is zigzag folded into an oblong stack in such a manner that some (2a) of the bendings of the tape flush with the ends of the stack whereas the remaining bendings (2b) are positioned at varying distances therefrom. The resulting tape, especially a seed tape, is suited for being pulled out through a dispensing opening in a germinating box on a bedding machine.

7 Claims, 2 Drawing Sheets

U.S. PATENT DOCUMENTS

| | | | |
|---|---|---|---|
| 5,529,564 A * | 6/1996 | Hediger | 493/413 |
| 5,711,134 A * | 1/1998 | Tanaka | 53/117 |
| 5,820,539 A * | 10/1998 | Strahm | 493/412 |
| 6,035,608 A * | 3/2000 | O'Connor | 340/511 |
| 6,071,223 A * | 6/2000 | Reider et al. | 493/11 |
| 6,176,068 B1 * | 1/2001 | O'Connor | 206/494 |
| 6,209,288 B1 * | 4/2001 | Rahn et al. | 53/429 |
| 6,240,674 B1 * | 6/2001 | Otake et al. | 47/56 |
| 6,446,386 B1 * | 9/2002 | Holloway | 47/56 |

* cited by examiner

PACKED TAPES AS WELL AS METHODS AND AN ASSEMBLY FOR PACKING SAID TAPES

TECHNICAL FIELD

The invention relates to a packed tape comprising a folded tape and a package preferably made of plastic film. The invention relates also to a method of producing a packed flexible tape comprising a folded tape and a package.

BACKGROUND ART

U.S. Pat. No. 5,211,621 discloses an assembly for zigzag folding a continuous tape, where the zigzag folding is carried out in a substantially horizontal plane and the bendings preferably oppose one another. The section of the assembly housing the zigzagged portions is provided with side slides controlling the amount of advanced zigzagged tape portions. The zigzag folding is established by the tape being carried through the gap between two juxtaposed rollers, said rollers reciprocating substantially perpendicular to the advancing direction of the tape. Such a zigzag folding of a tape is not completely satisfactory when the tape is a seed tape because the positioning of the bendings opposite one another is then encumbered with draw-backs. When the tape is a seed tape it is in connection with the placing and later germination of the tape in a germinating box as well as during the following bedding out by means of machines for bedding out seed or germinating tapes very important that said tape is placed with the bendings uniformly distributed across the width of the germinating box. Such a positioning of the bendings is very important for obtaining a uniform filling of the germinating box with tapes as said bendings take up more room in the box than the remaining portions of the tape, and consequently it is very important for uniform room conditions for the tape during the germination, said germination causing a swelling in the germinating portions. Finally it is very important for an unproblematic pulling out of the tape from the germinating box through the dispensing opening thereof.

BRIEF DESCRIPTION OF THE INVENTION

The object of the invention is to provide a packed tape, especially a seed tape of the above type, which is easily pulled out through a dispensing opening in the germinating box on the bedding machine in question.

The object of the invention is also to provide a method of producing the above packed tape, said method being far more simple and inexpensive than hitherto known.

The packed tape according to the invention is characterised in that the tape is zigzag folded into an oblong stack in such a manner that some of the bendings of the tape flush with the ends of the stack whereas the remaining bendings are positioned at varying distances therefrom. Once the packed tape has been placed in the germinating box and one end of the package has been opened, the resulting tape can be unproblematically pulled out through the dispensing opening of the germinating box, i.e. without said tape wedging in the dispensing opening or being damaged when passing said opening.

According to the invention the packed tape may comprise several stacks arranged in parallel, and the package may be a box optionally made of cardboard, whereby separating sheets may optionally be arranged between the stacks. In this manner it is possible to obtain a particularly long tape when the stacks arranged in parallel in the box have been placed in the germinating box, said particularly long tape being very advantageous when it is to be bedded out by means of a bedding machine.

The invention relates also to a method of producing a packed flexible tape comprising a folded tape and a package. This method is characterised in that the tape is advanced continuously optionally from a tape supply to a packing location where said tape is zigzag folded by virtue of its weight and by means of side lowering means into at least one oblong stack at the bottom of the package formed as a bag or a box in such a manner that some of the bendings of the tape flush with the ends of the stack and that the remaining bendings are positioned at varying distances therefrom, and that after the filling of the package the layers of the stack are compressed and the package is closed. As a result a simple packing of the tape in the desired shape is obtained, where a desired varying positioning of the bendings is obtained, and where the compressing of the stack and closing of the package have the effect that said package takes up minimum room during the following storage and/or transport.

According to the invention the used side lowering means may be formed by substantially vertical, endless, circulating lowering belts, the downward courses of said lowering belts opposing one another and being arranged at the ends of the stack, whereby the zigzagged tape forms bendings as said downward courses are tangent to the outermost tape bendings. In this manner it is ensured that the above flushing tape bendings are caught by the side lowering means as said bendings are formed at the uppermost layer of the stack and then carried downwards in such a manner that room is quickly provided for a fresh layer of tape on top of the stack. As a result an increase of the packing speed is obtained.

According to a particularly advantageous embodiment of the method according to the invention, the zigzag folding of the tape is carried out by means of at least one tape lowering means pivotally suspended above the packing location, whereby each tape lowering means comprises two co-acting endless circulating belts passing the tape downwards therebetween, and whereby the zigzag folding is controlled by the oscillating movement of the tape lowering means in combination with the tape layering speed. In this manner an additional increase of the packing speed and an accurately controlled positioning of the individual bendings of the tape are obtained.

When the tape is a germinating tape for instance comprising two layers of paper, this tape may according to the invention be of a width corresponding to maximum 90% of the distance between the walls of the package. As a result the germinating tape positions itself correctly during the zigzag folding in the bag and does not slide aside or turn over.

Moreover the zigzag folding and the compressing of the tape to be packed may according to the invention be carried out in a compartment defined by the lowering belts and some side guides, such as plates or bars, and towards the bottom by a package, such as a bag, placed on an optionally stepwise, laterally displaceable support, whereby after the compressing the package can be rolled up and closed about the stack at the same time as the compartment is removed. As a result a particularly reliable and fast zigzag folding of the tape is obtained in the package, and a faster production of the packed tape than hitherto known is also obtained.

Moreover the bag used may according to the invention be made of shrink film, whereby the package, such as the bag, can be subjected to a shrinking after its closing, for instance a hot air shrinking. In this manner the packed tape presents a compact unit in which the various layers of the tape are fixed relative to one another, the film closely abutting the zigzagged tape.

Furthermore, the packing may according to the invention be carried out under vacuum, whereby it is ensured that the package material abuts the tape particularly closely.

The invention relates furthermore to an assembly used in carrying out the method according to the invention, and this assembly is characterised in that it comprises an upwardly and downwardly open compartment, the opposing ends of which are provided with side lowering means in form of endless circulating belts, where the belt courses facing the interior of the compartment move downwards, said assembly further comprising a frame surrounding the compartment and retaining and optionally distending a package about said compartment, as well as a supporting means for the package, said supporting means being accommodated below the compartment and the frame and being separately adjustable in height and optionally stepwise, laterally displaceable. This assembly turned out to be particularly advantageous for carrying out the method according to the invention.

Finally the invention relates to an assembly used in carrying out the method according to the invention, said assembly being characterised in that it comprises at least one tape lowering means, which is preferably level adjustable and movable in the vertical direction during operation, and which is pivotally arranged about a point of the upper end of said tape lowering means, and which per se comprises two abutting endless circulating belts, where the opposing belt courses run downwards, said assembly further comprising an electronic control unit for controlling the reciprocating movement of the tape lowering means and the adjustment in height and optionally the stepwise, lateral displacement of a supporting means. This assembly turned out to be particularly advantageous in carrying out the method according to the invention, because it can control in a particularly accurate manner the length of each "zig" and "zag" of the zigzagged tape and the adjustment in height of the supporting means.

When the assembly is to be used for bags of shrink film, the assembly may according to the invention comprise a compressing means for the stack and a film shrinking equipment, preferably of the hot air or heat radiation type. As a result, the completely packed tape can be available as a rather compact package, where the film closely abuts the tape.

In addition to a plastic film as packaging material, it is also possible to use laminated plastic, which is optionally thin and corrugated. It is also possible to use a cardboard box as package.

BRIEF DESCRIPTION OF THE DRAWINGS

The invention is explained in detail below with reference to the accompanying drawing, in which.

BEST MODE FOR CARRYING OUT THE INVENTION

Figure 1:
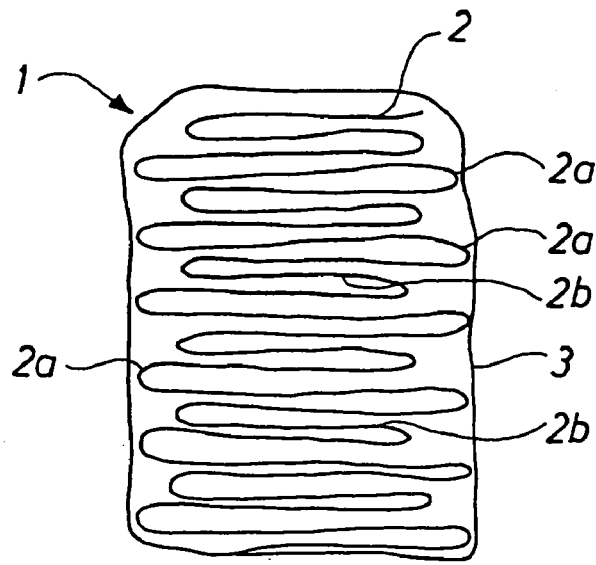
FIG. 1 is a horizontal sectional view through a packed tape according to the invention with a greatly exaggerated distance between the tape layers, and where the zigzagged tape and surrounding package clearly appear.

FIG. 1 is a diagrammatic view of a packed tape 1 comprising a folded tape 2 and a package 3 preferably made of plastic sheet. As illustrated, the tape 2 is folded in zigzag way in a stack. Some 2a of the bendings of the tape 2 are in contact with the package 3 at the ends of the stack, and the remaining bendings 2b are positioned at varying distances from said package.

Figure 2:
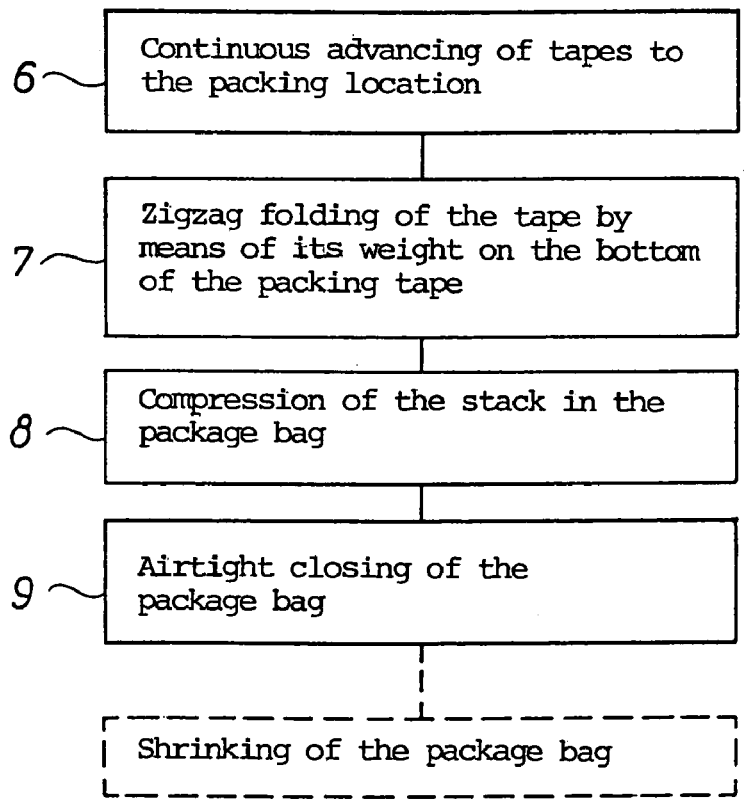
FIG. 2 is a diagrammatic view of the steps of the method according to the invention.

FIG. 2 is a diagrammatic view of the individual steps of a method of producing a packed flexible tape comprising a folded tape and a package. As shown at 6, a continuous advancing of the tape to a packing location is initially carried out. As shown at 7, the tape is placed zigzag by way of its own weight and by means of side lowering means as a stack on the bottom of the package formed as a bag. As shown at 8, the stack is then compressed, and as shown at 9 the bag is then closed. As shown at 10, the bag can be subjected to a shrinking provided it is made of shrink film, such as a hot air shrinking.

By the method, the side lowering means used can be formed by substantially vertical, endless, circulating lowering belts, the downward courses of said lowering belts opposing one another and being arranged at the ends of the stack, where the zigzagged tape forms bendings as said downward courses are tangent to the outermost tape bendings. The above is explained below with reference to FIG. 4.

Figure 3:
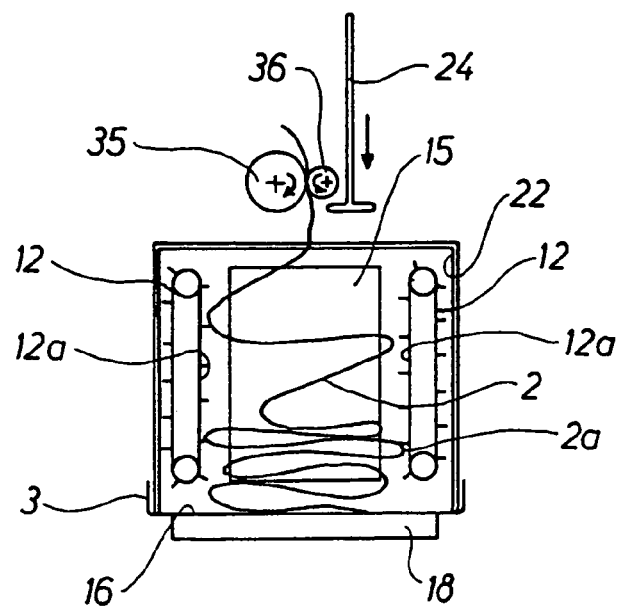
FIG. 3 is a diagrammatic view of an assembly used in carrying out the method according to the invention.

When the tape is a germinating tape, for instance made of two layers of paper, it can be of a width of 15 to 20 mm or corresponding to maximum 80% to 90% of the distance between the walls of the bag. The dimension in question of the tape is the dimension perpendicular to the paper of FIG. 1. The zigzag folding and the compress-ing of the zigzagged tape can be carried out in the compartment shown in FIGS. 3 and 4. This compartment is defined by side lowering means 12, 12' in form of substantially vertical, endless, circulating side lowering belts 12a. The course of the two endless belts 12 running downwards is indicated at 12a. As shown, the zigzag folding is also carried out by means of some side guides, such as plates 15, associated with the compartment. FIG. 3 only shows one of these side guides. These side guides can, however, also be bars. The zigzag folding is carried out on a bottom 16 of a bag 3 placed on a supporting means 18. After the above compressing of the tape, which is performed in vertical direction, the bag 3 can be rolled up and closed about the stack by means of means not shown and simultaneously with the compartment 12, 15 being removed from said stack.

As mentioned above, the bag 3 can optionally be subjected to a shrinking, for instance a hot air shrinking, in such a manner that it closely abuts the stack. The said packing can also be performed under vacuum.

Below the assembly shown in FIG. 3 is described in greater detail. The above side lowering means 12 and the side guides 15 form together an upwardly and downwardly open compartment, which can be lifted and lowered relative to the supporting means 18 of the assembly. The assembly comprises also a frame 22 arranged outside the compartment. This frame is used for distending the bag 3 about the compartment. The supporting means 18 is separately adjustable in height, which does not, however, appear from the Figure.

The assembly can also comprise a compressing means 24 rendering it possible to compress the tape 2. In addition, a film shrinking equipment not shown can be provided in the assembly, said equipment preferably being of the hot air or heat radiation type.

Figure 4:
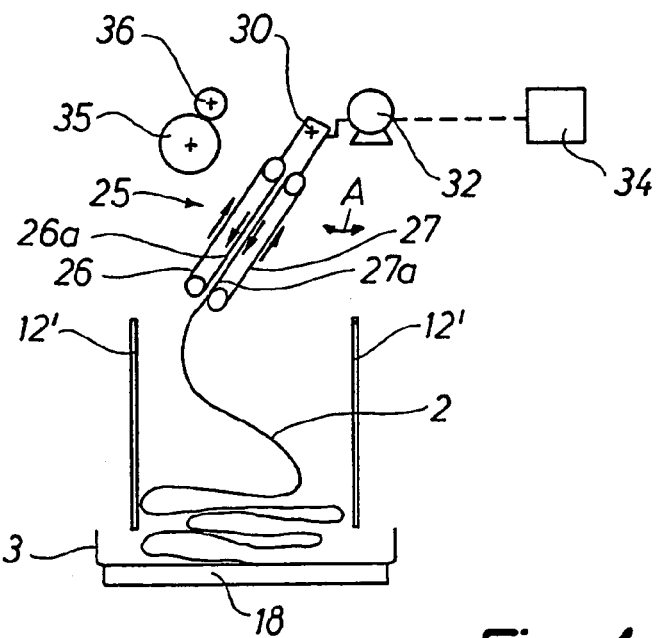
FIG. 4 is a diagrammatic view of a second assembly used in carrying out the method according to the invention.

FIG. 4 illustrates a second assembly used in carrying out the method according to the invention. This assembly is provided with a compartment with side lowering means 12' and a supporting means 18, on which the bottom of a bag 3 rests. Only the lowermost portion of the bag is shown in FIG. 4. The assembly comprises also a tape lowering means 25 pivotally arranged about a point 30 on the upper end of the tape lowering means 25. The tape lowering means 25 comprises abutting endless circulating belts 26 and 27, where the opposing belt courses 26a and 27a run downwards. In addition, a driving means 32 is provided, which reciprocates the tape lowering means 26 in an oscillation about the point 30 as indicated by means of the double arrow A. The control of the oscillating movement of the tape lowering means 25 is carried out by means of an electronic control unit 34. The tape 2 can be advanced to the compartment at a varying speed, and the oscillating movement of the tape lowering means 25 is controlled with variable oscillations in such a manner that the individual zigs and zags in the stack are provided with the desired size. The tape 2 is advanced from a tape supply 35 by means of advancing rollers 36 both in FIG. 3 and in FIG. 4. The tape lowering means 25 is level adjustable and movable in the vertical direction during the operation.

The assembly of FIG. 4 is also provided with a frame for retaining and distending the bag 3, but this frame is not shown.

Figure 5:
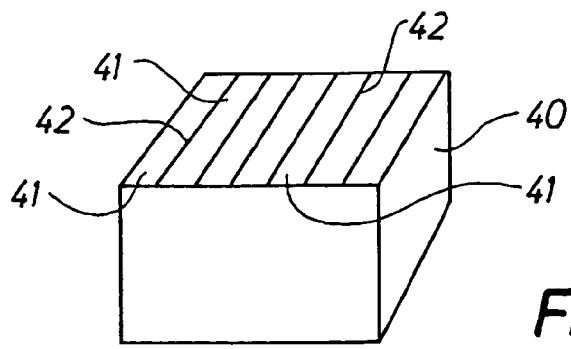
FIG. 5 is a perspective view of a package in form of a box.

Above reference has been made to a bag 3. Nothing prevents, however, said package from being for instance a cardboard box 40, cf. FIG. 5, and then the frame 22 supports the cardboard box. Then care is taken that the supporting means 18 can be displaced aside stepwise, for instance perpendicular to the plane of the paper in such a manner that many juxtaposed stacks can be placed in the box provided said box is sufficiently large. For instance seven juxtaposed tape lowering means, viz. one per tape, can optionally be provided in FIG. 4 instead of one tape lowering means 30. In this case, the package 41 is filled seven times as fast as usually, but the tapes in the seven stacks are not joined into one long coherent tape. Vertical separating sheets 42 of for instance cardboard or plastics can be inserted between the stacks of tape. These separating sheets can in the assemblies shown in FIG. 3 and FIG. 4 be lowered by means of particular sheet gripping members not shown. The separating sheets can optionally be built into the box 40. The box 40 can be considered a multi-package-box.

The invention may be modified in many ways without thereby deviating from the scope of the invention as defined in the appended claims.

What is claimed is:

1. A method of producing a packed, flexible, folded tape and a package containing seeds for germination, characterized in that the tape carries the seeds and is advanced continuously from a tape supply to a packing location where said tape is zigzag folded by virtue of its weight and by means of side lowering means into at least one oblong stack on the bottom of the package formed as a bag or a box in such a manner that some of the bendings of the tape are flush with the ends of the stack and that the remaining bendings are positioned at varying distances therefrom, thereby producing layers that are successively relatively long, intermediate and short, and facilitating pulling the tape out of the package, and that after the filling of the package the layers of the stack are compressed and the package is closed, characterized in that the side lowering means are formed by substantially vertical, endless, circulating lowering belts, the downward courses of said lowering belts opposing one another and being arranged at the ends of the stack, whereby the zigzag tape forms bendings as said downward courses are tangent to the outermost tape bendings.

2. A method as claimed in claim 1, characterized in that the zigzag folding of the tape is carried out by means of at least one tape lowering means pivotally suspended above the packing location, whereby each tape lowering means comprises two co-acting endless circulating belts passing the tape downwards therebetween, and whereby the zigzag folding is controlled by the oscillating movement of the tape lowering means in combination with the tape laying speed.

3. A method as claimed in claim 1, where the germinating tape comprises two layers of paper, characterized in that the tape is of a width corresponding to a maximum of 90% of the distance between the walls of the package.

4. A method as claimed in claim 1, characterized in that the zigzag folding and the compressing of the tape to be packed is carried out in a compartment defined by the lowering belts and some side guides, and towards the bottom by a package placed on a stepwise, laterally displaceable support, whereby after the compressing of the tape the package can be rolled up and closed about the stack at the same time as the compartment is removed.

5. A method as claimed in claim 1, characterized in that the bag used is made of shrink film, and that the package is subjected to a shrinking after its closing.

6. A method as claimed in claim 1, characterized in that the packing is carried out under vacuum.

7. An assembly for producing a packed, flexible, folded tape and a package containing seeds for germination, characterized in that it comprises an upwardly and downwardly open compartment, the opposing ends of said compartment being provided with side lowering means in the form of endless circulating belts, wherein the belts courses facing the interior of said compartment and move downwards said assembly further comprising a frame surrounding the compartment for retaining and distending a package about said compartment; a supporting means for the package, said supporting means being accommodated below the compartment and the frame and being separately adjustable in height and stepwise, laterally displacable;

at least one tape lowering means, which is level adjustable and movable in the vertical direction during operation, and which is pivotally arranged about a point of the upper end of said tape lowering means, and which comprises two abutting endless circulating belts, where the opposing belt courses run downwards, said assembly further comprising an electronic control unit for controlling the reciprocating movement of the tape lowering means and the adjustment in height and the stepwise, lateral displacement of a supporting means;

the package being made of shrink film, the assembly further comprising a compressing means for the package and a film shrinking equipment, of the hot air or heat radiation type.

* * * * *